(12) United States Patent
Liu et al.

(10) Patent No.: US 11,908,403 B2
(45) Date of Patent: Feb. 20, 2024

(54) DRIVING CIRCUIT OF LIGHT-EMITTING DEVICE, BACKLIGHT MODULE AND DISPLAY PANEL

(71) Applicant: Shenzhen China Star Optoelectronics Semiconductor Display Technology Co., Ltd., Shenzhen (CN)

(72) Inventors: Bin Liu, Shenzhen (CN); Quansheng Liu, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/281,102

(22) PCT Filed: Mar. 15, 2021

(86) PCT No.: PCT/CN2021/080789
§ 371 (c)(1),
(2) Date: Mar. 29, 2021

(87) PCT Pub. No.: WO2022/188191
PCT Pub. Date: Sep. 15, 2022

(65) Prior Publication Data
US 2023/0419894 A1    Dec. 28, 2023

(30) Foreign Application Priority Data

Mar. 8, 2021  (CN) .......................... 202110249982.8

(51) Int. Cl.
G09G 3/3233        (2016.01)
G09G 3/34          (2006.01)

(52) U.S. Cl.
CPC ......... G09G 3/3233 (2013.01); G09G 3/3406 (2013.01); *G09G 2300/0819* (2013.01);
(Continued)

(58) Field of Classification Search
CPC ...... G09G 3/3233; G09G 3/30; G09G 3/3266; G09G 3/3258; G09G 3/3291; G09G 3/32; G09G 3/20; G09G 3/3208; G09G 3/3283; G09G 2300/0819; G09G 2300/0861; G09G 2300/0842; G09G 2300/0852;
(Continued)

(56) References Cited

U.S. PATENT DOCUMENTS

2008/0218448 A1    9/2008  Park et al.
2014/0111563 A1    4/2014  Hwang et al.
(Continued)

FOREIGN PATENT DOCUMENTS

CN    105096826 A    11/2015
CN    107492336 A    12/2017
(Continued)

*Primary Examiner* — Dong Hui Liang
(74) *Attorney, Agent, or Firm* — Nathan & Associates; Menachem Nathan

(57) ABSTRACT

A driving circuit of a light-emitting device, a backlight module and a display panel are disclosed in the present disclosure. The driving circuit of the light-emitting device includes a light-emitting device, a driving transistor, a data signal writing module, a first power signal writing module, a second power signal writing module, a light-emitting control module, and a storage module.

20 Claims, 5 Drawing Sheets

(52) U.S. Cl.
CPC ........... *G09G 2300/0842* (2013.01); *G09G 2300/0861* (2013.01); *G09G 2310/08* (2013.01); *G09G 2320/0261* (2013.01); *G09G 2320/045* (2013.01); *G09G 2320/0626* (2013.01)

(58) Field of Classification Search
CPC ... G09G 2300/0426; G09G 2300/0866; G09G 2320/0233; G09G 2320/045; G09G 2320/043; G09G 2320/0223; G09G 2310/0262; G09G 2310/08
See application file for complete search history.

(56) References Cited

U.S. PATENT DOCUMENTS

| | | | | |
|---|---|---|---|---|
| 2014/0118232 | A1* | 5/2014 | Kim | H10K 59/131 345/82 |
| 2014/0138644 | A1* | 5/2014 | Park | H10K 59/1213 438/34 |
| 2015/0294625 | A1* | 10/2015 | Lee | G09G 3/3233 345/691 |
| 2016/0322446 | A1* | 11/2016 | Park | G09G 3/3233 |
| 2019/0385530 | A1* | 12/2019 | Gao | G09G 3/3258 |
| 2022/0319417 | A1* | 10/2022 | Liu | G09G 3/3241 |
| 2023/0039449 | A1* | 2/2023 | Kim | G09G 3/2014 |

FOREIGN PATENT DOCUMENTS

| | | |
|---|---|---|
| CN | 107784977 A | 3/2018 |
| CN | 210378423 U | 4/2020 |
| CN | 111798801 A | 10/2020 |
| CN | 112233620 A | 1/2021 |

* cited by examiner

DRIVING CIRCUIT OF LIGHT-EMITTING DEVICE, BACKLIGHT MODULE AND DISPLAY PANEL

FIELD OF INVENTION

The present application relates to the field of display technologies, and in particular to a driving circuit of a light-emitting device, a backlight module and a display panel.

BACKGROUND OF INVENTION

Light-emitting devices, such as mini light-emitting diodes, micro light-emitting diodes, and organic light-emitting diodes, have the advantages of high brightness, high contrast, and high color gamut, and have been rapidly applied to new display fields. In a device driving circuit of the existing light-emitting device, the driving transistor is prone to a threshold voltage shift under long-term current pressure, so that the brightness of the light-emitting device is attenuated and the display is uneven.

In recent years, in order to solve the brightness attenuation of the light-emitting device caused by the threshold voltage shift of the driving transistor, a large number of compensation circuits have appeared. In mini light-emitting diodes and micro light-emitting diodes, the voltage grayscale-slicing method may cause the problem of low-gray-scale display brightness unevenness. The reason is that the light-emitting device emits unevenly under the low current. In order to avoid the problems of uneven brightness display caused by the low current and the threshold voltage shift caused by the current pressure when the light-emitting device works, a pixel driving circuit is usually combined with a driving mode of time-sliced gray-scale pulse width modulation, so that the light-emitting device always works in a stable light-emitting stage with the high-current, and thus the problem of uneven display will not occur, while the threshold voltage of the driving transistor is compensated. However, a number of grayscales in the existing driving circuit of the light-emitting device is relatively small.

SUMMARY OF INVENTION

Technical Problems:

The present disclosure provides a driving circuit of a light-emitting device, a backlight module, and a display panel, which can solve the problem of the brightness attenuation of the light-emitting device caused by the deviation of the threshold voltage of the driving transistor, and increase a number of grayscales.

Technical Solutions:

In a first aspect, the present disclosure provides a driving circuit of a light-emitting device, comprising: a light-emitting device, connected in series to a light-emitting circuit formed by a first power signal and a second power signal; a driving transistor, wherein a source and a drain of the driving transistor are connected in series to the light-emitting circuit, and the driving transistor is configured to control a current flowing through the light-emitting circuit; a data signal writing module, receiving a first scan signal and a data signal, and electrically connected to one of the source and the drain of the driving transistor, wherein the data signal writing module is configured to write the data signal to one of the source and the drain of the driving transistor under control of the first scan signal; a first power signal writing module, receiving a second scan signal and the first power signal, and electrically connected to a gate of the driving transistor, wherein the first power signal writing module is configured to write the first power signal into the gate of the driving transistor under control of the second scan signal; a second power signal writing module, receiving a third scan signal and the second power signal, and electrically connected to the gate of the driving transistor, wherein the second power signal writing module is configured to write the second power signal into the gate of the driving transistor under control of the third scan signal; a light-emitting control module, receiving a light-emitting control signal and connected in series to the light-emitting circuit, wherein the light-emitting control module is configured to control the light-emitting circuit to be turned on or to be turned off based on the light-emitting control signal; and a storage module, electrically connected to the gate of the driving transistor and receiving the second power signal, wherein the storage module is configured to store a potential of the gate of the driving transistor.

In the driving circuit of the light-emitting device provided in the present disclosure, the driving circuit of the light-emitting device further comprises a compensation module, receiving a fourth scan signal, and electrically connected to the other of the source and the drain of the driving transistor and the gate of the driving transistor, wherein the compensation module is configured to compensate a threshold voltage of the driving transistor under control of the fourth scan signal.

In the driving circuit of the light-emitting device provided in the present disclosure, the compensation module includes a first transistor, a gate of the first transistor receives the fourth scan signal, one of a source and a drain of the first transistor is electrically connected to the gate of the driving transistor, and the other of the source and the drain of the first transistor is electrically connected to one of the source and the drain of the driving transistor.

In the driving circuit of the light-emitting device provided in the present disclosure, the light-emitting control module includes: a first light-emitting control unit, receiving the light-emitting control signal, and connected in series to the light-emitting circuit, wherein the first light-emitting control unit is configured to control the light-emitting circuit to be turned on or to be turned off under control of the light-emitting control signal; and/or a second light-emitting control unit, receiving the light-emitting control signal, and connected in series to the light-emitting circuit, wherein the second light-emitting control unit is configured to control the light-emitting circuit to be turned on or to be turned off under control of the light-emitting control signal.

In the driving circuit of the light-emitting device provided in the present disclosure, the light-emitting control module includes the first light-emitting control unit and the second light-emitting control unit, the first light-emitting control unit includes a second transistor, and the second light-emitting control unit includes a third transistor; wherein a gate of the second transistor and a gate of the third transistor both receive the light-emitting control signal, one of a source and a drain of the second transistor is electrically connected to one end of the light-emitting device, and the other of the source and the drain of the second transistor is electrically connected to one of the source and the drain of the driving transistor; wherein one of a source and a drain of the third transistor receives the second power signal, and the other of the source and the drain of the third transistor is electrically connected to the other of the source and the drain of the driving transistor.

In the driving circuit of the light-emitting device provided in the present disclosure, the data signal writing module includes a fourth transistor, a gate of the fourth transistor receives the first scan signal, one of a source and a drain of the fourth transistor receives the data signal, and the other of the source and the drain of the fourth transistor is electrically connected to one of the source and the drain of the driving transistor; wherein the first power signal writing module includes a fifth transistor, a gate of the fifth transistor receives the second scan signal, one of a source and a drain of the fifth transistor receives the first power signal, and the other of the source and the drain of the fifth transistor is electrically connected to the gate of the driving transistor; wherein the second power signal writing module includes a sixth transistor, a gate of the sixth transistor receives the third scan signal, one of a source and a drain of the sixth transistor receives the second power signal, and the other of the source and the drain of the sixth transistor is electrically connected to the gate of the driving transistor; wherein the storage module includes a storage capacitor, one end of the storage capacitor is electrically connected to the gate of the driving transistor, and the other end of the storage capacitor receives the second power signal.

In the driving circuit of the light-emitting device provided in the present disclosure, the driving circuit of the light-emitting device controls a turn-on time node of the sixth transistor through the third scan signal, and slices an iso-molecular field to a non-isomolecular field for a pulse width of the light-emitting device.

In the driving circuit of the light-emitting device provided in the present disclosure, a driving control timing of the driving circuit of the light-emitting device includes a reset stage, a compensation stage, a light-emitting stage, and a black frame insertion stage; wherein in the reset stage, the first scan signal and the second scan signal are both at a high potential, and the fourth scan signal, the third scan signal, and the light-emitting control signal are all at a low potential; wherein in the compensation stage, the first scan signal and the fourth scan signal are both at a high potential, and the second scan signal, the third scan signal, and the light-emitting control signal are all at a low potential; wherein in the light-emitting stage, the light-emitting control signal is at a high potential, and the first scan signal, the second scan signal, the fourth scan signal, and the third scan signal are all at a low potential; wherein in the black frame insertion stage, the light-emitting control signal and the third scan signal are both at a high potential, and the first scan signal, the second scan signal, and the fourth scan signal are all at a low potential.

In the driving circuit of the light-emitting device provided in the present disclosure, a potential of the first power signal is greater than a potential of the second power signal.

In the second aspect, the present disclosure further provides a backlight module, comprising: a data line, configured to provide a data signal; a first scan line, configured to provide a first scan signal; a second scan line, configured to provide a second scan signal; a third scan line, configured to provide a third scan signal; a light-emitting control signal line, configured to provide a light-emitting control signal; and a driving circuit of a light-emitting device, connected to the data line, the first scan line, the second scan line, the third scan line, and the light-emitting control signal line; wherein the driving circuit of the light-emitting device includes: a light-emitting device, connected in series to a light-emitting circuit formed by a first power signal and a second power signal; a driving transistor, wherein a source and a drain of the driving transistor are connected in series to the light-emitting circuit, and the driving transistor is configured to control a current flowing through the light-emitting circuit; a data signal writing module, receiving the first scan signal and the data signal, and electrically connected to one of the source and the drain of the driving transistor, wherein the data signal writing module is configured to write the data signal to one of the source and the drain of the driving transistor under control of the first scan signal; a first power signal writing module, receiving the second scan signal and the first power signal, and electrically connected to a gate of the driving transistor, wherein the first power signal writing module is configured to write the first power signal into the gate of the driving transistor under control of the second scan signal; a second power signal writing module, receiving the third scan signal and the second power signal, and electrically connected to the gate of the driving transistor, wherein the second power signal writing module is configured to write the second power signal into the gate of the driving transistor under control of the third scan signal; a light-emitting control module, receiving the light-emitting control signal and connected in series to the light-emitting circuit, wherein the light-emitting control module is configured to control the light-emitting circuit to be turned on or to be turned off based on the light-emitting control signal; and a storage module, electrically connected to the gate of the driving transistor and receiving the second power signal, wherein the storage module is configured to store a potential of the gate of the driving transistor.

In the backlight module provided in the present disclosure, the driving circuit of the light-emitting device further includes a compensation module, receiving a fourth scan signal, and electrically connected to the other of the source and the drain of the driving transistor and the gate of the driving transistor, wherein the compensation module is configured to compensate a threshold voltage of the driving transistor under control of the fourth scan signal.

In the backlight module provided in the present disclosure, the compensation module includes a first transistor, a gate of the first transistor receives the fourth scan signal, one of a source and a drain of the first transistor is electrically connected to the gate of the driving transistor, and the other of the source and the drain of the first transistor is electrically connected to one of the source and the drain of the driving transistor.

In the backlight module provided in the present disclosure, the light-emitting control module includes: a first light-emitting control unit, receiving the light-emitting control signal, and connected in series to the light-emitting circuit, wherein the first light-emitting control unit is configured to control the light-emitting circuit to be turned on or to be turned off under control of the light-emitting control signal; and/or a second light-emitting control unit, receiving the light-emitting control signal, and connected in series to the light-emitting circuit, wherein the second light-emitting control unit is configured to control the light-emitting circuit to be turned on or to be turned off under control of the light-emitting control signal.

In the backlight module provided in the present disclosure, the light-emitting control module includes the first light-emitting control unit and the second light-emitting control unit, the first light-emitting control unit includes a second transistor, and the second light-emitting control unit includes a third transistor; wherein a gate of the second transistor and a gate of the third transistor both receive the light-emitting control signal, one of a source and a drain of the second transistor is electrically connected to one end of the light-emitting device, and the other of the source and the drain of the second transistor is electrically connected to one of the source and the drain of the driving transistor; wherein one of a source and a drain of the third transistor receives the second power signal, and the other of the source and the drain of the third transistor is electrically connected to the other of the source and the drain of the driving transistor.

In the backlight module provided in the present disclosure, the data signal writing module includes a fourth transistor, a gate of the fourth transistor receives the first scan signal, one of a source and a drain of the fourth transistor receives the data signal, and the other of the source and the drain of the fourth transistor is electrically connected to one of the source and the drain of the driving transistor; wherein the first power signal writing module includes a fifth transistor, a gate of the fifth transistor receives the second scan signal, one of a source and a drain of the fifth transistor receives the first power signal, and the other of the source and the drain of the fifth transistor is electrically connected to the gate of the driving transistor; wherein the second power signal writing module includes a sixth transistor, a gate of the sixth transistor receives the third scan signal, one of a source and a drain of the sixth transistor receives the second power signal, and the other of the source and the drain of the sixth transistor is electrically connected to the gate of the driving transistor; wherein the storage module includes a storage capacitor, one end of the storage capacitor is electrically connected to the gate of the driving transistor, and the other end of the storage capacitor receives the second power signal.

In a third aspect, the present disclosure further provides a display panel, comprising: a plurality of pixel units arranged in an array, and the driving circuit of the light-emitting device includes: a light-emitting device, connected in series to a light-emitting circuit formed by a first power signal and a second power signal; a driving transistor, wherein a source and a drain of the driving transistor are connected in series to the light-emitting circuit, and the driving transistor is configured to control a current flowing through the light-emitting circuit; a data signal writing module, receiving a first scan signal and a data signal, and electrically connected to one of the source and the drain of the driving transistor, wherein the data signal writing module is configured to write the data signal to one of the source and the drain of the driving transistor under control of the first scan signal; a first power signal writing module, receiving a second scan signal and the first power signal, and electrically connected to a gate of the driving transistor, wherein the first power signal writing module is configured to write the first power signal into the gate of the driving transistor under control of the second scan signal; a second power signal writing module, receiving a third scan signal and the second power signal, and electrically connected to the gate of the driving transistor, wherein the second power signal writing module is configured to write the second power signal into the gate of the driving transistor under control of the third scan signal; a light-emitting control module, receiving a light-emitting control signal and connected in series to the light-emitting circuit, wherein the light-emitting control module is configured to control the light-emitting circuit to be turned on or to be turned off based on the light-emitting control signal; and a storage module, electrically connected to the gate of the driving transistor and receiving the second power signal, wherein the storage module is configured to store a potential of the gate of the driving transistor.

In the display panel provided by the present disclosure, the driving circuit of the light-emitting device further includes a compensation module, receiving a fourth scan signal, and electrically connected to the other of the source and the drain of the driving transistor and the gate of the driving transistor, wherein the compensation module is configured to compensate a threshold voltage of the driving transistor under control of the fourth scan signal.

In the display panel provided by the present disclosure, the light-emitting control module includes: a first light-emitting control unit, receiving the light-emitting control signal, and connected in series to the light-emitting circuit, wherein the first light-emitting control unit is configured to control the light-emitting circuit to be turned on or to be turned off under control of the light-emitting control signal; and/or a second light-emitting control unit, receiving the light-emitting control signal, and connected in series to the light-emitting circuit, wherein the second light-emitting control unit is configured to control the light-emitting circuit to be turned on or to be turned off under control of the light-emitting control signal.

In the display panel provided by the present disclosure, the light-emitting control module includes the first light-emitting control unit and the second light-emitting control unit, the first light-emitting control unit includes a second transistor, and the second light-emitting control unit includes a third transistor; wherein a gate of the second transistor and a gate of the third transistor both receive the light-emitting control signal, one of a source and a drain of the second transistor is electrically connected to one end of the light-emitting device, and the other of the source and the drain of the second transistor is electrically connected to one of the source and the drain of the driving transistor; wherein one of a source and a drain of the third transistor receives the second power signal, and the other of the source and the drain of the third transistor is electrically connected to the other of the source and the drain of the driving transistor.

In the display panel provided by the present disclosure, the data signal writing module includes a fourth transistor, a gate of the fourth transistor receives the first scan signal, one of a source and a drain of the fourth transistor receives the data signal, and the other of the source and the drain of the fourth transistor is electrically connected to one of the source and the drain of the driving transistor; wherein the first power signal writing module includes a fifth transistor, a gate of the fifth transistor receives the second scan signal, one of a source and a drain of the fifth transistor receives the first power signal, and the other of the source and the drain of the fifth transistor is electrically connected to the gate of the driving transistor; wherein the second power signal writing module includes a sixth transistor, a gate of the sixth transistor receives the third scan signal, one of a source and a drain of the sixth transistor receives the second power signal, and the other of the source and the drain of the sixth transistor is electrically connected to the gate of the driving transistor; wherein the storage module includes a storage capacitor, one end of the storage capacitor is electrically connected to the gate of the driving transistor, and the other end of the storage capacitor receives the second power signal.

Beneficial Effect:

In the driving circuit of the light-emitting device, the backlight module, and the display panel provided by the present disclosure, by providing a black frame insertion for the light-emitting device by the second power signal writing module and adjusting the iso-molecular field to the non-isomolecular field for the pulse width of the light-emitting device, a variety of grayscale changes can be achieved.

DETAILED DESCRIPTION OF PREFERRED EMBODIMENTS

The technical solutions in the embodiments of the present disclosure will be clearly and completely described below with reference to the accompanying drawings in the embodiments of the present disclosure. Obviously, the described embodiments are only a part of the embodiments of the present disclosure, rather than all the embodiments. Based on the embodiments in the present disclosure, all other embodiments obtained by those skilled in the art without creative work shall fall within the protection scope of the present disclosure.

In addition, the terms "first", "second", etc. in the specification and claims of the present disclosure and the above-mentioned drawings are used to distinguish different objects, rather than to describe a specific sequence. In addition, the terms "including" and "having" and their conjugates mean including but not limited to.

It should be noted that, since a source and a drain of the transistor used in the present disclosure are symmetrical, the source and the drain can be interchanged.

Figure 1:
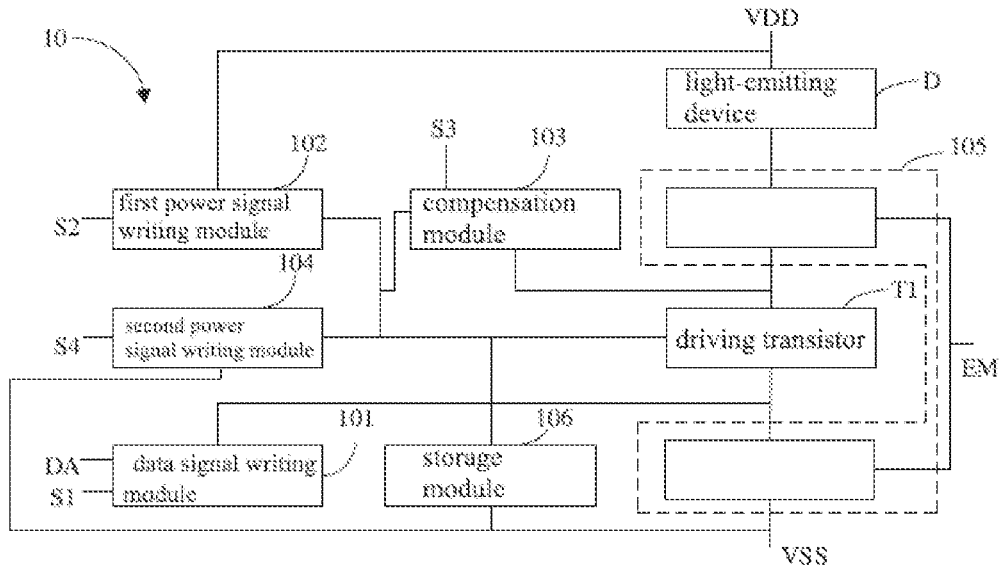
FIG. 1 is a schematic structural diagram of a driving circuit of a light-emitting device provided by an embodiment of the present disclosure.

Please refer to FIG. 1. FIG. 1 is a schematic structural diagram of a driving circuit of a light-emitting device provided by an embodiment of the present disclosure. As shown in FIG. 1, the driving circuit of the light-emitting device 10 provided by the embodiment of the present disclosure includes a light-emitting device D, a driving transistor T1, a data signal writing module 101, a first power signal writing module 102, and a second power signal writing module 104, a light-emitting control module 105 and a storage module 106. It should be noted that the light-emitting device D can be a mini light-emitting diode, a mini light-emitting diode, or an organic light-emitting diode.

The light-emitting device D is connected in series to a light-emitting circuit formed by a first power signal VDD and a second power signal VSS. A source and a drain of the driving transistor T1 are connected in series to the light-emitting circuit. The data signal writing module 101 receives a first scan signal S1 and a data signal DA, and is electrically connected to one of the source and the drain of the driving transistor T1. The first power signal writing module 102 receives a second scan signal S2 and the first power signal VDD, and is electrically connected to a gate of the driving transistor T1. The second power signal writing module 104 receives the third scan signal S4 and the second power signal VSS, and is electrically connected to the gate of the driving transistor T1. The light-emitting control module 105 receives the light-emitting control signal EM, and is connected in series to the light-emitting circuit. The storage module 106 is electrically connected to the gate of the driving transistor T1 and receives the second power signal VSS.

It should be noted that in the embodiment of the present disclosure, it is only necessary to determine that the light-emitting control module 105 and the light-emitting device D are connected in series to the light-emitting circuit. The driving circuit of the light-emitting device 10 shown in FIG. 1 only illustrates the specific locations of the light-emitting control module 105 and the light-emitting device D. That is, the light-emitting control module 105 and the light-emitting device D can be connected in series at any position on the light-emitting circuit.

Further, the driving circuit of the light-emitting device 10 provided by the embodiment of the present disclosure further includes a compensation module 103. The compensation module 103 receives a fourth scan signal S3, and is electrically connected to the other of the source and the drain of the driving transistor T1 and the gate of the driving transistor T1.

Specifically, the driving transistor T1 is configured to control a current flowing through the light-emitting circuit. The data signal writing module 101 is configured to write the data signal DA into one of the source and the drain of the driving transistor T1 under control of the first scan signal S1. The first power signal writing module 102 is configured to write the first power signal VDD into the gate of the driving transistor T1 under control of the second scan signal S2. The compensation module 103 is configured to compensate the threshold voltage of the driving transistor T1 under control of the fourth scan signal S3. The second power signal writing module 104 is configured to write the second power signal VSS into the gate of the driving transistor T1 under control of the third scan signal S4. The light-emitting control module 105 is configured to control the light-emitting circuit to be turned on or to be turned off based on the light-emitting control signal EM. The storage module 106 is configured to store a potential of the gate of the driving transistor T1.

In the driving circuit of the light-emitting device 10 provided by the embodiment of the present disclosure, by providing a black frame insertion for the light-emitting device D by the second power signal writing module 104 and adjusting an iso-molecular field to a non-isomolecular field for a pulse width of the light-emitting device D, various grayscale changes are achieved and a number of bits is increased.

Figure 2:
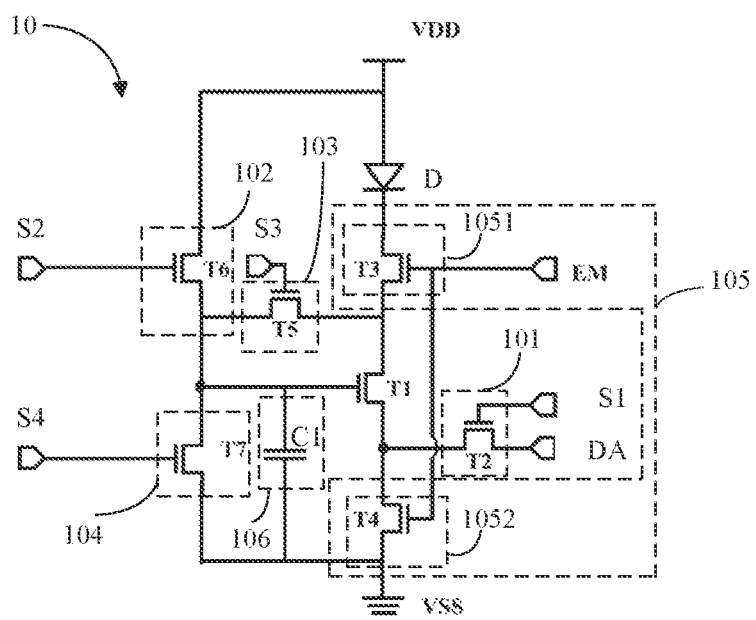
FIG. 2 is a schematic structural diagram of a circuit of the driving circuit of the light-emitting device provided by an embodiment of the present disclosure.

In some embodiments, please refer to FIG. 2, which is a schematic circuit diagram of the driving circuit of the light-emitting device provided by an embodiment of the present disclosure. As shown in FIGS. 1 and 2, the data signal writing module 101 includes a fourth transistor T2. A gate of the fourth transistor T2 receives the first scan signal S1. One of a source and a drain of the fourth transistor T2 receives the data signal DA. The other of the source and the drain of the fourth transistor T2 is electrically connected to one of the source and the drain of the driving transistor T1. Certainly, it is understandable that the data signal writing module 101 can also be formed by using multiple transistors in series.

In some embodiments, please continue to refer to FIGS. 1 and 2, the light-emitting control module 105 includes a first light-emitting control unit 1051 and a second light-emitting control unit 1052. The first light-emitting control unit 1051 is electrically connected to one end of the light-emitting device D and the source of the driving transistor T1, and receives the light-emitting control signal EM. The second light-emitting control unit 1052 is electrically connected to the drain of the driving transistor T1, and receives the light-emitting control signal EM and the second power signal VSS. The first light-emitting control unit 1051 and the second light-emitting control unit 1052 are both used to control the light-emitting circuit to be turned on or to be turned off under control of the light-emitting control signal EM. Certainly, it is understandable that only the first light-emitting control unit 1051 or the second light-emitting control unit 1052 must be provided in the light-emitting control module 105. Alternatively, the light-emitting control 105 may also include three or more light-emitting control units.

In a specific embodiment, the first light-emitting control unit 1051 includes a second transistor T3. The second light-emitting control unit 1052 includes a third transistor T4. Both a gate of the second transistor T3 and a gate of the third transistor T4 receive the light-emitting control signal EM. One of a source and a drain of the second transistor T3 is electrically connected to one end of the light-emitting device D. The other of the source and the drain of the second transistor T3 is electrically connected to one of the source and the drain of the driving transistor T1. One of the source and the drain of the third transistor T4 receives the second power signal VSS. The other of the source and the drain of the third transistor T4 is electrically connected to the other of the source and the drain of the driving transistor T1. Certainly, it is understandable that the first light-emitting control unit 1051 may further be formed by using multiple transistors in series, and the second light-emitting control unit 1052 may further be formed by using multiple transistors in series.

In some embodiments, please continue to refer to FIGS. 1 and 2, the compensation module 103 includes a first transistor T5. A gate of the first transistor T5 receives the fourth scan signal S3. One of the source and the drain of the first transistor T5 is electrically connected to the gate of the driving transistor T1. The other of the source and the drain of the first transistor T5 is electrically connected to one of the source and the drain of the driving transistor T1. Certainly, it is understandable that the compensation module 103 may further be formed by using multiple transistors in series.

In some embodiments, please continue to refer to FIGS. 1 and 2, the first power signal writing module 102 includes a fifth transistor T6. A gate of the fifth transistor T6 receives the second scan signal S2. One of the source and the drain of the fifth transistor T6 receives the first power signal VDD. The other of the source and the drain of the fifth transistor T6 is electrically connected to the gate of the driving transistor T1. Certainly, it is understandable that the first power signal writing module 102 may further be formed by using multiple transistors in series.

In some embodiments, please continue to refer to FIGS. 1 and 2. The second power signal writing module 104 includes a sixth transistor T7. A gate of the sixth transistor T7 receives the third scan signal S4. One of the source and the drain of the sixth transistor T7 receives the second power signal VSS. The other of the source and the drain of the sixth transistor T7 is electrically connected to the gate of the driving transistor T1. Certainly, it is understandable that the second power signal writing module 104 may further be formed by using multiple transistors in series.

It should be noted that the driving circuit of the light-emitting device 10 provided by the embodiment of the present disclosure controls a turn-on time node of the sixth transistor T7 and adjusts an iso-molecular field to the non-isomolecular field for the pulse width of the light-emitting device, thereby realizing various grayscale changes, so as to achieve an increased number of bits.

In some embodiments, please continue to refer to FIGS. 1 and 2. The storage module 106 includes a storage capacitor C1. One end of the storage capacitor C1 is electrically connected to the gate of the driving transistor T1. The other end of the storage capacitor C1 receives the second power signal VSS.

The driving circuit of the light-emitting device 10 provided by the embodiment of the present disclosure uses a driving circuit of a light-emitting device with a 7T1C (7 transistors and 1 capacitor) structure to control the light-emitting device D, which uses fewer components, has a simple and stable structure, and saves costs.

In some embodiments, both the first power signal VDD and the second power signal VSS are used to output a predetermined voltage value. In addition, in the embodiment of the present disclosure, a potential of the first power signal VDD is greater than a potential of the second power signal VSS. Specifically, the potential of the second power signal VSS may be a potential of a ground terminal. Certainly, it is understandable that the potential of the second power signal VSS may also be other.

In some embodiments, the driving transistor T1, the fourth transistor T2, the second transistor T3, the third transistor T4, the first transistor T5, the fifth transistor T6, and the sixth transistor T7 may be one or more of low temperature polysilicon thin film transistors, oxide semiconductor thin films, or amorphous silicon thin film transistors. Further, the transistors in the driving circuit of the light-emitting device 10 provided in the embodiments of the present disclosure may be provided to be the same type of transistor, so as to avoid the influence of the difference between different types of transistors on the driving circuit of the light-emitting device 10.

Figure 3:
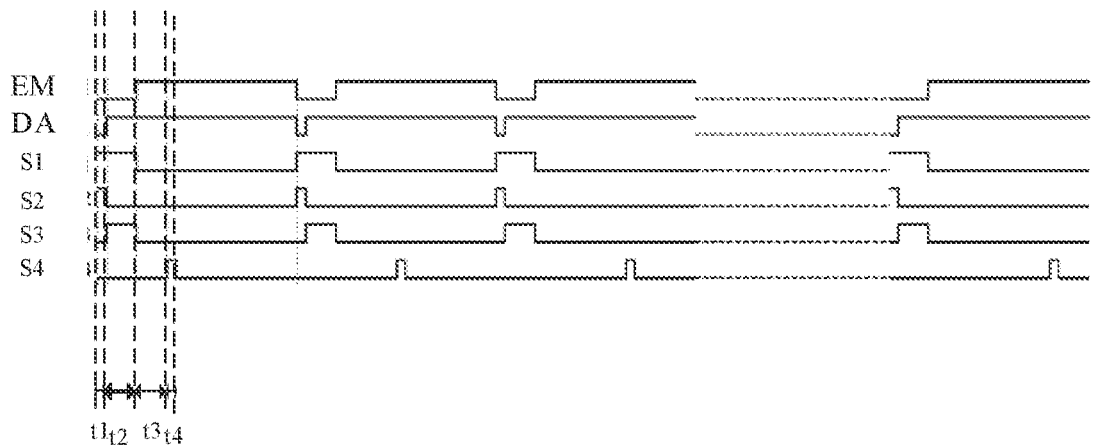
FIG. 3 is a schematic structural diagram of a timing of the driving circuit of the light-emitting device provided by an embodiment of the present disclosure.

Please refer to FIG. 3. FIG. 3 is diagram of a timing of the driving circuit of the light-emitting device provided by an embodiment of the present disclosure. The light-emitting control signal EM, the first scan signal S1, the second scan signal S2, the fourth scan signal S3, and the third scan signal S4 sequentially correspond to a reset stage t1, a compensation stage t2, a light-emitting stage t3, and a black frame insertion stage t4. That is, within a frame time, the driving control timing of the driving circuit of the light-emitting device 10 provided by the embodiment of the present disclosure includes a reset stage t1, a compensation stage t2, a light-emitting stage t3, and a black frame insertion stage t4.

In some embodiments, all the reset stage t1, the first scan signal S1, and the second scan signal S2 are at a high potential, and all the fourth scan signal S3, the third scan signal S4, and the light-emitting control signal EM are at a low potential. At this time, a potential of the data signal DA is low.

In some embodiments, all the compensation stage t2, the first scan signal S1, and the fourth scan signal S3 are at a high potential, and all the second scan signal S2, the third scan signal S4, and the light-emitting control signal EM are at a low potential. At this time, the potential of the data signal DA is high.

In some embodiments, both the light-emitting stage t3 and the light-emitting control signal EM are at a high potential, and all the first scan signal S1, the second scan signal S2, the fourth scan signal S3, and the third scan signal S4 are at a low potential. At this time, the potential of the data signal DA is high.

In some embodiments, all the frame black insertion stage t4, the light-emitting control signal EM, and the third scan signal S4 are at a high potential, and all the first scan signal S1, the second scan signal S2, and the fourth scan signal S3 are at a low potential. At this time, the potential of the data signal DA is high. It should be noted that a pulse width of the third scan signal S4 can be set as required. The driving circuit of the light-emitting device provided in the embodiment of the present disclosure sets the pulse width of the third scan signal S4, thereby controlling the turn-on time node of the sixth transistor T7; and adjusts the iso-molecular field to the non-isomolecular field for the pulse width of the light-emitting device D, thereby achieving various grayscale changes.

Figure 4:
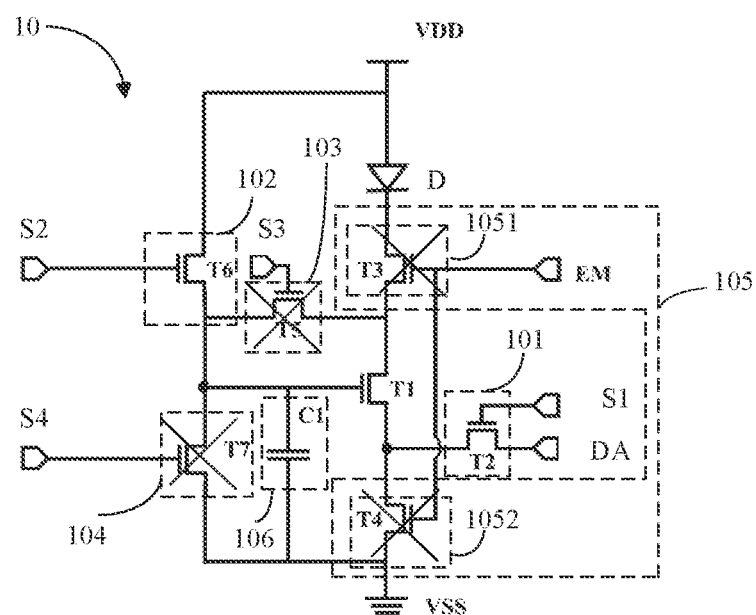
FIG. 4 is a schematic diagram of a path of the driving circuit of the light-emitting device provided by the embodiment of the present disclosure in the reset stage upon the driving timing shown in FIG. 3.

Specifically, please refer to FIGS. 3 and 4. FIG. 4 is a schematic diagram of a path of the driving circuit of the light-emitting device provided by the embodiment of the present disclosure in the reset stage upon the driving timing shown in FIG. 3. In the reset stage t1, the first scan signal S1 is at a high potential, the fourth transistor T2 is turned on under control of the high potential of the first scan signal S1, and the data signal DA is written into one of the source and the drain of the driving transistor T1. At this time, the potential of the data signal DA is at a low potential, and the low potential of the data signal DA is written into one of the source and the drain of the driving transistor T1 through the fourth transistor T2, so as to realize the initialization of one of the source and the drain of the driving transistor T1. In the reset stage t1, the second scan signal S2 is at a high potential, the fifth transistor T6 is turned on under control of the high potential of the second scan signal S2, and the first power signal VDD is written into the gate of the driving transistor T1. The potential of the first power signal VDD is written into the gate of the driving transistor T1 through the fifth transistor T6 to realize the initialization of the gate of the driving transistor T1. At this time, the driving transistor T1 is turned on.

At the same time, in the reset stage t1, since the light-emitting control signal EM, the fourth scan signal S3, and the third scan signal S4 are all at a low potential, the second transistor T3, the third transistor T4, the first transistor T5, and the sixth transistor T7 are all turned off.

Figure 5:
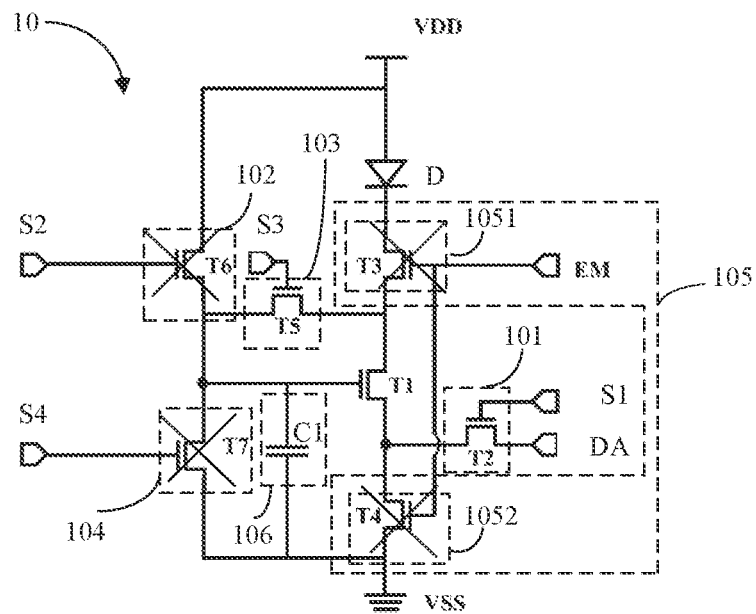
FIG. 5 is a schematic diagram of a path of the driving circuit of the light-emitting device provided by the embodiment of the present disclosure in the compensation stage upon the driving timing shown in FIG. 3.

Please refer to FIGS. 3 and 5. FIG. 5 is a schematic diagram of a path of the driving circuit of the light-emitting device provided by an embodiment of the present disclosure in the compensation stage upon the driving timing shown in FIG. 3. In the compensation stage t2, the first scan signal S1 is at a high potential, the fourth transistor T2 is turned on under control of the high potential of the first scan signal S1, and the data signal DA is written into one of the source and the drain of the driving transistor T1. At this time, the potential of the data signal DA is at a high potential, and the high potential of the data signal DA is written into one of the source and the drain of the driving transistor T1 through the fourth transistor T2, and the potential of one of the source and the drain of the driving transistor T1 is changed from the low potential of the data signal DA to the high potential of the data signal DA. In the compensation stage t2, the fourth scan signal S3 is at a high potential, and the first transistor T5 is turned on under control of the high potential of the fourth scan signal S3. At this time, the first transistor T5 is connected to one of the source and the drain of the driving transistor T1 and the gate of the driving transistor T1, and one of the source and the drain of the driving transistor T1 and the gate of the driving transistor T1 are formed to a diode structure, so that the potential of the gate of the driving transistor T1 drops from the potential of the first power signal VDD to a sum of the high potential of the data signal DA and the threshold voltage of the driving transistor T1. In addition, due to the existence of the storage capacitor C1, the potential of the gate of the driving transistor T1 is maintained at the sum of the high potential of the data signal DA and the threshold voltage of the driving transistor T1. At this time, the driving transistor T1 is still turned on.

At the same time, in the compensation stage t2, since the light-emitting control signal EM, the second scan signal S2, and the third scan signal S4 are all at a low potential, so that the second transistor T3, the third transistor T4, the fifth transistor T6, and the sixth transistor T7 are all turned off.

Figure 6:
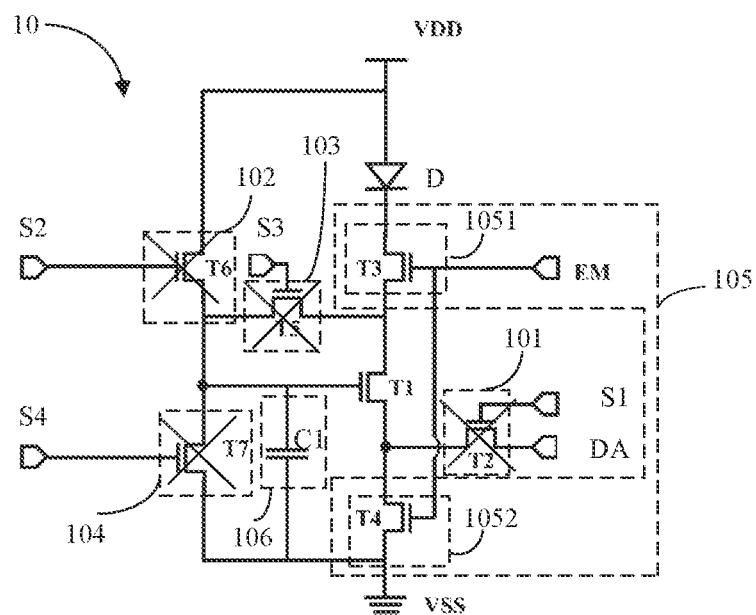
FIG. 6 is a schematic diagram of a path of the driving circuit of the light-emitting device provided by the embodiment of the present disclosure in the light-emitting stage upon the driving timing shown in FIG. 3.

Please refer to FIGS. 3 and 6. FIG. 6 is a schematic diagram of a path of the driving circuit of the light-emitting device provided by the embodiment of the present disclosure in the light-emitting stage upon the driving timing shown in FIG. 3. In the light-emitting stage t3, the light-emitting control signal EM is at a high potential, the second transistor T3 is turned on under control of the high potential of the light-emitting control signal EM, and the third transistor T4 is turned on under control of the high potential of the light-emitting control signal EM. At this time, the potential of the gate of the driving transistor T1 is the sum of the high potential of the data signal DA and the threshold voltage of the driving transistor T1 VDATA+Vth, and the potential of one of the source and the drain of the driving transistor T1 is V0.

Further, the formula for calculating the current flowing through the light-emitting device D is as follows:

IOLED=1/2Cox $(\mu 1 W1/L1)(Vgs-Vth))2$, where IOLED is the current flowing through the light-emitting device D, $\mu 1$ is the carrier mobility of the driving transistor T1, W1 and L1 are a width and a length of the channel of the first transistor T1, respectively, Vgs is the voltage difference between the gate of the driving transistor T1 and one of the source and the drain of the driving transistor T1, and Vth is the threshold voltage of the driving transistor T1.

That is, the current flowing through the light-emitting device D: IOLED=1/2Cox$(\mu 1W1/L1)(Vgs-Vth)2$=1/2Cox $(\mu 1W1/L1)(VDATA+Vth-V0-Vth)2$=1/2Cox$(\mu W1/L1)$ $(VDATA-V0)2$ 。

At this time, the driving transistor T1 is still turned on, the light-emitting device D emits light, and the current flowing through the light-emitting device D is independent of the threshold voltage of the driving transistor T1, thereby achieving the threshold voltage compensation effect.

At the same time, in the light-emitting stage t3, since the first scan signal S1, the second scan signal S2, the fourth scan signal S3, and the third scan signal S4 are all at a low potential, the fourth transistor T2, the first transistor T5, the fifth transistor T6, and the sixth transistor T7 are all turned off.

Figure 7:
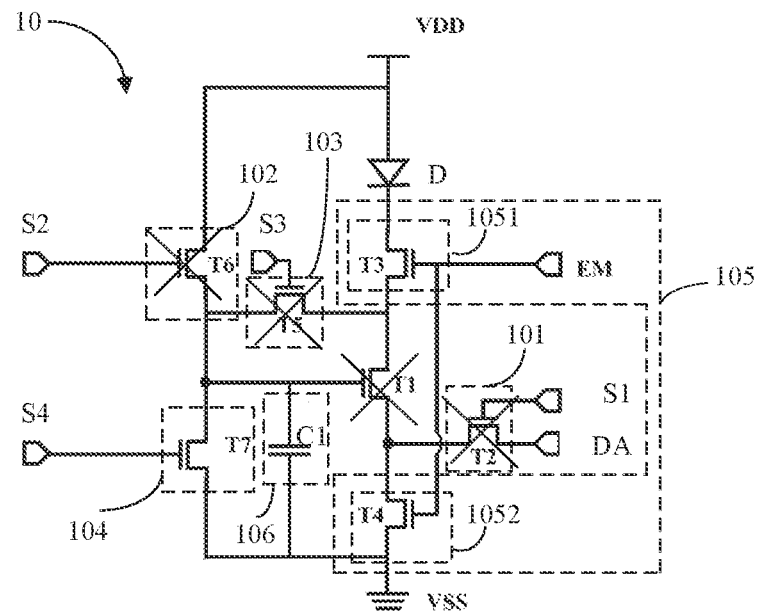
FIG. 7 is a schematic diagram of a path of the driving circuit of the light-emitting device provided by the embodiment of the present disclosure in the light-emitting stage upon the driving timing shown in FIG. 3.

Please refer to FIGS. 3 and 7. FIG. 7 is a schematic diagram of a path of the driving circuit of the light-emitting device provided by the embodiment of the present disclosure in the light-emitting stage upon the driving timing shown in FIG. 3. In the black frame insertion stage t4, the light-emitting control signal EM is at a high potential, the second transistor T3 is turned on under control of the high potential of the light-emitting control signal EM, and the third transistor T4 is turned on under control of the high potential of the light-emitting control signal EM. In the black frame insertion stage t4, the third scan signal S4 is at a high potential, the sixth transistor T7 is turned on under control of the high potential of the third scan signal S4, and the second power signal VSS is written into the gate of the driving transistor T1 through the sixth transistor T7. That is, the potential of the gate of the driving transistor T1 drops to the potential of the second power signal VSS, so that the driving transistor T1 is turned off, thereby achieving the black frame insertion for the light-emitting device. In this way, by controlling the turn-on time node of the sixth transistor T7 and adjusting the iso-molecular field to the non-isomolecular field for the pulse width of the light-emitting device D, a variety of grayscale changes can be realized, and a number of bits can be increased.

Figure 8:
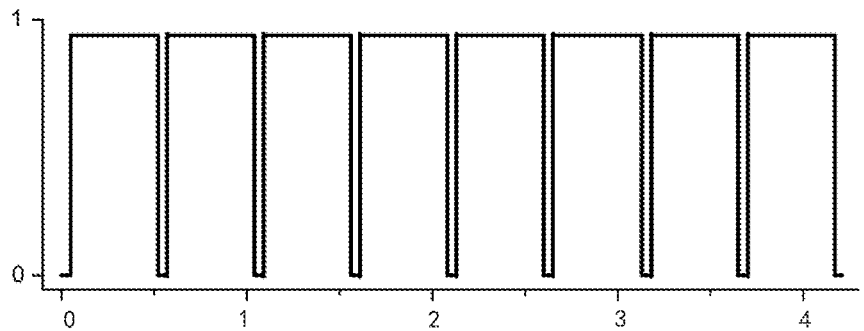
FIG. 8 is a schematic diagram of a subfield distribution of a conventionally driving circuit of a light-emitting device.
Figure 9:
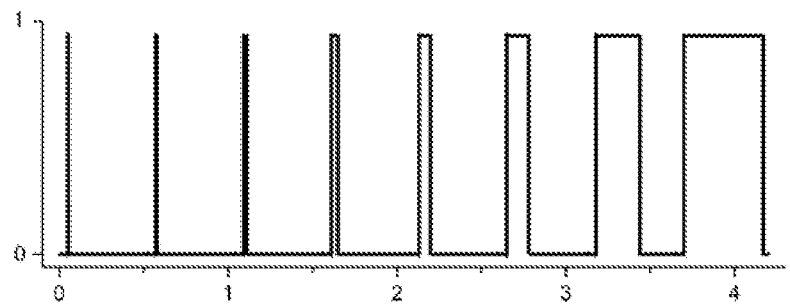
FIG. 9 is a schematic diagram of a subfield distribution of the driving circuit of the light-emitting device provided by an embodiment of the present disclosure.

Further, please refer to FIGS. 8 and 9. FIG. 8 is a schematic diagram of a subfield distribution of the conventional driving circuit of the light-emitting device. FIG. 9 is a schematic diagram of a subfield distribution of the driving circuit of the light-emitting device provided by an embodiment of the present disclosure. In FIGS. 8 and 9, the abscissa represents time, and the ordinate represents current.

It should be noted that the difference between the existing pixel driving circuit and the pixel driving circuit of the present disclosure is that the existing pixel driving circuit does not have a second power signal writing module.

Please refer to FIGS. 8 and 9. Taking a pane with 240 Hz and 10 rows as an example, it is assumed that threshold voltage detection and compensation takes 50 microseconds, the existing driving circuit of the light-emitting device implements iso-molecular field drive mode, and only 8 grayscales can be achieved. The driving circuit of the light-emitting device of the present disclosure controls the second power signal writing module 104, i.e., controlling the turn-on time node of the sixth transistor T7, thereby achieving a black frame insertion for the light-emitting device. Accordingly, the original 8 iso-molecular fields become 8 non-isomolecular fields. That is, 8 non-isomolecular fields can achieve 256 grayscale changes, thereby greatly increasing the number of bits without losing the compensation range, i.e., increasing the number of grayscales.

Figure 10:
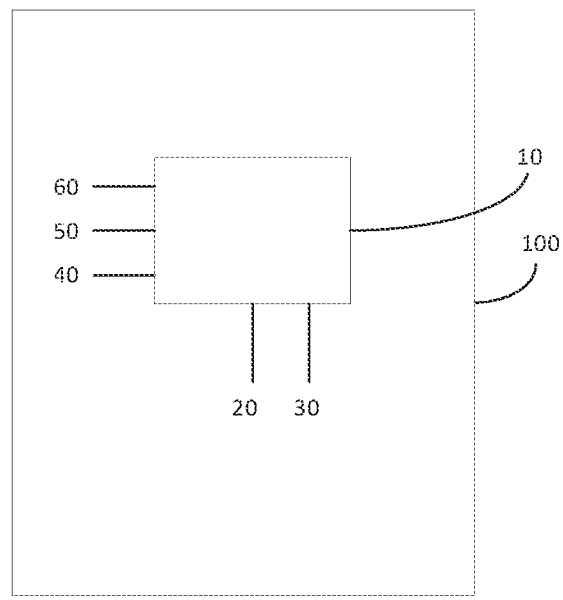
FIG. 10 is a schematic structural diagram of a backlight module provided by an embodiment of the present disclosure.

Please refer to FIG. 10, which is a schematic structural diagram of a backlight module provided by an embodiment of the present disclosure. The embodiment of the present disclosure also provides a backlight module 100, which includes a first scan line 20, a second scan line 30, a third scan line a light-emitting control signal line 50, a data line 60, and the above-mentioned driving circuit of the light-emitting device 10. The data line 60 is configured to provide data signals. The first scan line 20 is configured to provide a first scan signal. The second scan line 30 is configured to provide a second scan signal. The third scan line 40 is configured to provide a third scan signal. The light-emitting control signal line 50 is configured to provide a light-emitting control signal. The driving circuit of the light-emitting device 10 is connected to the data line 60, the first scan line 20, the second scan line 30, the third scan line 40, and the light-emitting control signal line 50. For details of the driving circuit of the light-emitting device 10, please refer to the above description for the driving circuit of the light-emitting device, and is not repeated here.

Figure 11:
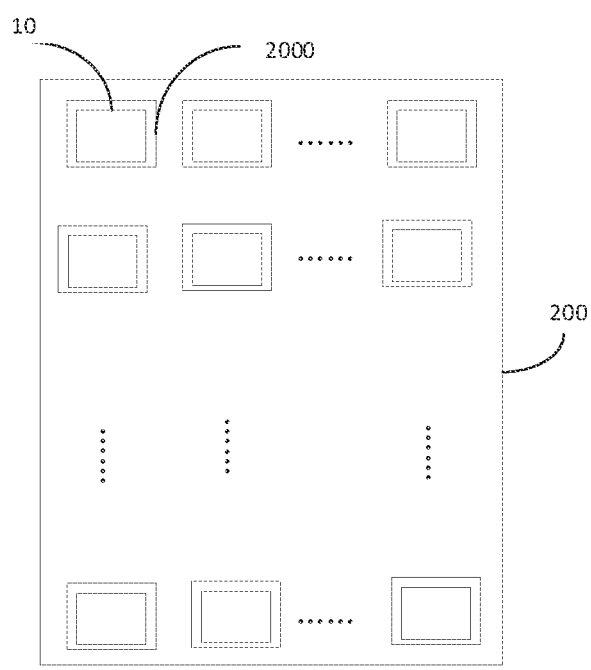
FIG. 11 is a schematic structural diagram of a display panel provided by an embodiment of the present disclosure.

Please refer to FIG. 11. FIG. 11 is a schematic structural diagram of a display panel provided by an embodiment of the present disclosure. An embodiment of the present disclosure further provides a display panel 200, which includes a plurality of pixel units 2000 arranged in an array. Each pixel unit 2000 includes the driving circuit of the light-emitting device 10 mentioned above. For details, please refer to the above description for the driving circuit of the light-emitting device 10, and is not repeated here.

The above description is only the embodiment of the present disclosure, and does not limit the patent scope of the present disclosure. Any equivalent structure or equivalent process change made by using the description and drawings of the present disclosure, or directly or indirectly used in other related technical fields, is also included in the patent protection scope of the present disclosure.

What is claimed is:

1. A driving circuit of a light-emitting device, comprising:
    a light-emitting device, connected in series to a light-emitting circuit formed by a first power signal and a second power signal;
    a driving transistor, wherein a source and a drain of the driving transistor are connected in series to the light-emitting circuit, and the driving transistor is configured to control a current flowing through the light-emitting circuit;
    a data signal writing module, receiving a first scan signal and a data signal, and electrically connected to one of the source and the drain of the driving transistor, wherein the data signal writing module is configured to write the data signal to one of the source and the drain of the driving transistor under control of the first scan signal;
    a first power signal writing module, receiving a second scan signal and the first power signal, and electrically connected to a gate of the driving transistor, wherein the first power signal writing module is configured to write the first power signal into the gate of the driving transistor under control of the second scan signal;
    a second power signal writing module, receiving a third scan signal and the second power signal, and electrically connected to the gate of the driving transistor, wherein the second power signal writing module is configured to write the second power signal into the gate of the driving transistor under control of the third scan signal;
    a light-emitting control module, receiving a light-emitting control signal and connected in series to the light-emitting circuit, wherein the light-emitting control module is configured to control the light-emitting circuit to be turned on or to be turned off based on the light-emitting control signal; and
    a storage module, electrically connected to the gate of the driving transistor and receiving the second power signal, wherein the storage module is configured to store a potential of the gate of the driving transistor.

2. The driving circuit of the light-emitting device of claim 1, wherein the driving circuit of the light-emitting device further comprises a compensation module, receiving a fourth scan signal, and electrically connected to the other of the source and the drain of the driving transistor and the gate of the driving transistor, wherein the compensation module is configured to compensate a threshold voltage of the driving transistor under control of the fourth scan signal.

3. The driving circuit of the light-emitting device of claim 2, wherein the compensation module includes a first transistor, a gate of the first transistor receives the fourth scan signal, one of a source and a drain of the first transistor is electrically connected to the gate of the driving transistor, and the other of the source and the drain of the first transistor is electrically connected to one of the source and the drain of the driving transistor.

4. The driving circuit of the light-emitting device of claim 1, wherein the light-emitting control module includes:
   a first light-emitting control unit, receiving the light-emitting control signal, and connected in series to the light-emitting circuit, wherein the first light-emitting control unit is configured to control the light-emitting circuit to be turned on or to be turned off under control of the light-emitting control signal; and/or
   a second light-emitting control unit, receiving the light-emitting control signal, and connected in series to the light-emitting circuit, wherein the second light-emitting control unit is configured to control the light-emitting circuit to be turned on or to be turned off under control of the light-emitting control signal.

5. The driving circuit of the light-emitting device of claim 4, wherein the light-emitting control module includes the first light-emitting control unit and the second light-emitting control unit, the first light-emitting control unit includes a second transistor, and the second light-emitting control unit includes a third transistor;
   wherein a gate of the second transistor and a gate of the third transistor both receive the light-emitting control signal, one of a source and a drain of the second transistor is electrically connected to one end of the light-emitting device, and the other of the source and the drain of the second transistor is electrically connected to one of the source and the drain of the driving transistor;
   wherein one of a source and a drain of the third transistor receives the second power signal, and the other of the source and the drain of the third transistor is electrically connected to the other of the source and the drain of the driving transistor.

6. The driving circuit of the light-emitting device of claim 1, wherein the data signal writing module includes a fourth transistor, a gate of the fourth transistor receives the first scan signal, one of a source and a drain of the fourth transistor receives the data signal, and the other of the source and the drain of the fourth transistor is electrically connected to one of the source and the drain of the driving transistor;
   wherein the first power signal writing module includes a fifth transistor, a gate of the fifth transistor receives the second scan signal, one of a source and a drain of the fifth transistor receives the first power signal, and the other of the source and the drain of the fifth transistor is electrically connected to the gate of the driving transistor;
   wherein the second power signal writing module includes a sixth transistor, a gate of the sixth transistor receives the third scan signal, one of a source and a drain of the sixth transistor receives the second power signal, and the other of the source and the drain of the sixth transistor is electrically connected to the gate of the driving transistor;
   wherein the storage module includes a storage capacitor, one end of the storage capacitor is electrically connected to the gate of the driving transistor, and the other end of the storage capacitor receives the second power signal.

7. The driving circuit of the light-emitting device of claim 6, wherein the driving circuit of the light-emitting device controls a turn-on time node of the sixth transistor through the third scan signal, and slices an iso-molecular field to a non-isomolecular field for a pulse width of the light-emitting device.

8. The driving circuit of the light-emitting device of claim 1, wherein a driving control timing of the driving circuit of the light-emitting device includes a reset stage, a compensation stage, a light-emitting stage, and a black frame insertion stage;
   wherein in the reset stage, the first scan signal and the second scan signal are both at a high potential, and the fourth scan signal, the third scan signal, and the light-emitting control signal are all at a low potential;
   wherein in the compensation stage, the first scan signal and the fourth scan signal are both at a high potential, and the second scan signal, the third scan signal, and the light-emitting control signal are all at a low potential;
   wherein in the light-emitting stage, the light-emitting control signal is at a high potential, and the first scan signal, the second scan signal, the fourth scan signal, and the third scan signal are all at a low potential;
   wherein in the black frame insertion stage, the light-emitting control signal and the third scan signal are both at a high potential, and the first scan signal, the second scan signal, and the fourth scan signal are all at a low potential.

9. The driving circuit of the light-emitting device of claim 1, wherein a potential of the first power signal is greater than a potential of the second power signal.

10. A backlight module, comprising:
   a data line, configured to provide a data signal;
   a first scan line, configured to provide a first scan signal;
   a second scan line, configured to provide a second scan signal;
   a third scan line, configured to provide a third scan signal;
   a light-emitting control signal line, configured to provide a light-emitting control signal; and
   a driving circuit of a light-emitting device, connected to the data line, the first scan line, the second scan line, the third scan line, and the light-emitting control signal line;
   wherein the driving circuit of the light-emitting device includes:
   a light-emitting device, connected in series to a light-emitting circuit formed by a first power signal and a second power signal;
   a driving transistor, wherein a source and a drain of the driving transistor are connected in series to the light-emitting circuit, and the driving transistor is configured to control a current flowing through the light-emitting circuit;
   a data signal writing module, receiving the first scan signal and the data signal, and electrically connected to one of the source and the drain of the driving transistor, wherein the data signal writing module is configured to write the data signal to one of the source and the drain of the driving transistor under control of the first scan signal;

a first power signal writing module, receiving the second scan signal and the first power signal, and electrically connected to a gate of the driving transistor, wherein the first power signal writing module is configured to write the first power signal into the gate of the driving transistor under control of the second scan signal;

a second power signal writing module, receiving the third scan signal and the second power signal, and electrically connected to the gate of the driving transistor, wherein the second power signal writing module is configured to write the second power signal into the gate of the driving transistor under control of the third scan signal;

a light-emitting control module, receiving the light-emitting control signal and connected in series to the light-emitting circuit, wherein the light-emitting control module is configured to control the light-emitting circuit to be turned on or to be turned off based on the light-emitting control signal; and a storage module, electrically connected to the gate of the driving transistor and receiving the second power signal, wherein the storage module is configured to store a potential of the gate of the driving transistor.

11. The backlight module of claim 10, wherein the driving circuit of the light-emitting device further includes a compensation module, receiving a fourth scan signal, and electrically connected to the other of the source and the drain of the driving transistor and the gate of the driving transistor, wherein the compensation module is configured to compensate a threshold voltage of the driving transistor under control of the fourth scan signal.

12. The backlight module of claim 11, wherein the compensation module includes a first transistor, a gate of the first transistor receives the fourth scan signal, one of a source and a drain of the first transistor is electrically connected to the gate of the driving transistor, and the other of the source and the drain of the first transistor is electrically connected to one of the source and the drain of the driving transistor.

13. The backlight module of claim 10, wherein the light-emitting control module includes:

a first light-emitting control unit, receiving the light-emitting control signal, and connected in series to the light-emitting circuit, wherein the first light-emitting control unit is configured to control the light-emitting circuit to be turned on or to be turned off under control of the light-emitting control signal; and/or a second light-emitting control unit, receiving the light-emitting control signal, and connected in series to the light-emitting circuit, wherein the second light-emitting control unit is configured to control the light-emitting circuit to be turned on or to be turned off under control of the light-emitting control signal.

14. The backlight module of claim 13, wherein the light-emitting control module includes the first light-emitting control unit and the second light-emitting control unit, the first light-emitting control unit includes a second transistor, and the second light-emitting control unit includes a third transistor;

wherein a gate of the second transistor and a gate of the third transistor both receive the light-emitting control signal, one of a source and a drain of the second transistor is electrically connected to one end of the light-emitting device, and the other of the source and the drain of the second transistor is electrically connected to one of the source and the drain of the driving transistor;

wherein one of a source and a drain of the third transistor receives the second power signal, and the other of the source and the drain of the third transistor is electrically connected to the other of the source and the drain of the driving transistor.

15. The backlight module of claim 10, wherein the data signal writing module includes a fourth transistor, a gate of the fourth transistor receives the first scan signal, one of a source and a drain of the fourth transistor receives the data signal, and the other of the source and the drain of the fourth transistor is electrically connected to one of the source and the drain of the driving transistor;

wherein the first power signal writing module includes a fifth transistor, a gate of the fifth transistor receives the second scan signal, one of a source and a drain of the fifth transistor receives the first power signal, and the other of the source and the drain of the fifth transistor is electrically connected to the gate of the driving transistor;

wherein the second power signal writing module includes a sixth transistor, a gate of the sixth transistor receives the third scan signal, one of a source and a drain of the sixth transistor receives the second power signal, and the other of the source and the drain of the sixth transistor is electrically connected to the gate of the driving transistor;

wherein the storage module includes a storage capacitor, one end of the storage capacitor is electrically connected to the gate of the driving transistor, and the other end of the storage capacitor receives the second power signal.

16. A display panel, comprising: a plurality of pixel units arranged in an array, wherein each of the pixel units includes a driving circuit of a light-emitting device, and the driving circuit of the light-emitting device includes:

a light-emitting device, connected in series to a light-emitting circuit formed by a first power signal and a second power signal;

a driving transistor, wherein a source and a drain of the driving transistor are connected in series to the light-emitting circuit, and the driving transistor is configured to control a current flowing through the light-emitting circuit;

a data signal writing module, receiving a first scan signal and a data signal, and electrically connected to one of the source and the drain of the driving transistor, wherein the data signal writing module is configured to write the data signal to one of the source and the drain of the driving transistor under control of the first scan signal;

a first power signal writing module, receiving a second scan signal and the first power signal, and electrically connected to a gate of the driving transistor, wherein the first power signal writing module is configured to write the first power signal into the gate of the driving transistor under control of the second scan signal;

a second power signal writing module, receiving a third scan signal and the second power signal, and electrically connected to the gate of the driving transistor, wherein the second power signal writing module is configured to write the second power signal into the gate of the driving transistor under control of the third scan signal;

a light-emitting control module, receiving a light-emitting control signal and connected in series to the light-emitting circuit, wherein the light-emitting control module is configured to control the light-emitting circuit to be turned on or to be turned off based on the light-emitting control signal; and a storage module, electrically connected to the gate of the driving transistor and receiving the second power signal, wherein the storage module is configured to store a potential of the gate of the driving transistor.

17. The display panel of claim 16, wherein the driving circuit of the light-emitting device further includes a compensation module, receiving a fourth scan signal, and electrically connected to the other of the source and the drain of the driving transistor and the gate of the driving transistor, wherein the compensation module is configured to compensate a threshold voltage of the driving transistor under control of the fourth scan signal.

18. The display panel of claim 16, wherein the light-emitting control module includes:
- a first light-emitting control unit, receiving the light-emitting control signal, and connected in series to the light-emitting circuit, wherein the first light-emitting control unit is configured to control the light-emitting circuit to be turned on or to be turned off under control of the light-emitting control signal; and/or
- a second light-emitting control unit, receiving the light-emitting control signal, and connected in series to the light-emitting circuit, wherein the second light-emitting control unit is configured to control the light-emitting circuit to be turned on or to be turned off under control of the light-emitting control signal.

19. The display panel of claim 16, wherein the light-emitting control module includes the first light-emitting control unit and the second light-emitting control unit, the first light-emitting control unit includes a second transistor, and the second light-emitting control unit includes a third transistor;

wherein a gate of the second transistor and a gate of the third transistor both receive the light-emitting control signal, one of a source and a drain of the second transistor is electrically connected to one end of the light-emitting device, and the other of the source and the drain of the second transistor is electrically connected to one of the source and the drain of the driving transistor;

wherein one of a source and a drain of the third transistor receives the second power signal, and the other of the source and the drain of the third transistor is electrically connected to the other of the source and the drain of the driving transistor.

20. The display panel of claim 16, wherein the data signal writing module includes a fourth transistor, a gate of the fourth transistor receives the first scan signal, one of a source and a drain of the fourth transistor receives the data signal, and the other of the source and the drain of the fourth transistor is electrically connected to one of the source and the drain of the driving transistor;

wherein the first power signal writing module includes a fifth transistor, a gate of the fifth transistor receives the second scan signal, one of a source and a drain of the fifth transistor receives the first power signal, and the other of the source and the drain of the fifth transistor is electrically connected to the gate of the driving transistor;

wherein the second power signal writing module includes a sixth transistor, a gate of the sixth transistor receives the third scan signal, one of a source and a drain of the sixth transistor receives the second power signal, and the other of the source and the drain of the sixth transistor is electrically connected to the gate of the driving transistor;

wherein the storage module includes a storage capacitor, one end of the storage capacitor is electrically connected to the gate of the driving transistor, and the other end of the storage capacitor receives the second power signal.

* * * * *